United States Patent [19]

Brunelle

[11] Patent Number: 5,381,528
[45] Date of Patent: Jan. 10, 1995

[54] DEMAND ALLOCATION OF READ/WRITE BUFFER PARTITIONS FAVORING SEQUENTIAL READ CACHE

[75] Inventor: Philip E. Brunelle, Longmont, Colo.

[73] Assignee: Maxtor Corporation, San Jose, Calif.

[21] Appl. No.: 961,464

[22] Filed: Oct. 15, 1992

[51] Int. Cl.6 .......................... G06F 13/00; G06F 9/38
[52] U.S. Cl. ..................................... 395/250; 395/425; 364/DIG. 1; 364/236.2; 364/239.4; 364/DIG. 2; 364/926.4; 364/952.1
[58] Field of Search .............................. 395/250, 425; 364/236.2, 238.8, 239.4, 926.4, 939.7, 952.1, 961.1

[56] References Cited

U.S. PATENT DOCUMENTS

| | | | |
|---|---|---|---|
| 3,924,245 | 12/1975 | Eaton et al. | 364/200 |
| 4,169,289 | 9/1979 | Shively | 364/900 |
| 4,592,019 | 5/1986 | Huang et al. | 365/78 |
| 4,825,098 | 4/1989 | Aoyama | 307/243 |
| 4,866,671 | 9/1989 | Yokoyama | 364/900 |
| 5,003,471 | 3/1991 | Gibson | 364/200 |
| 5,034,916 | 7/1991 | Osterlund | 364/900 |
| 5,042,007 | 8/1991 | D'Luna | 365/78 |
| 5,056,010 | 10/1991 | Huang | 364/200 |
| 5,121,480 | 6/1992 | Bonke et al. | 395/250 |

Primary Examiner—Thomas C. Lee
Assistant Examiner—Fran R. Faller
Attorney, Agent, or Firm—Blakely, Sokoloff, Taylor & Zafman

[57] ABSTRACT

A method and apparatus is disclosed for partitioning a data buffer to create separate read and write buffers, wherein the boundaries between the buffers and the sizes of the buffers change dynamically depending upon the command mix received from the host computer. Data buffer space is allocated to provide highest priority to processing the current host command, and next priority to preserving a read ahead cache.

14 Claims, 4 Drawing Sheets

DEMAND ALLOCATION OF READ/WRITE BUFFER PARTITIONS FAVORING SEQUENTIAL READ CACHE

FIELD OF THE INVENTION

The present invention pertains to the field of input/output functions in a computer system. More particularly, this invention relates to methods for partitioning a data buffer into read and write buffers for transferring data between a host computer and a data storage device.

BACKGROUND OF THE INVENTION

Data transfer between a host computer and a data storage device typically originates at a source, passes through a data buffer and ends at a destination. Typically, the data buffer comprises a random access memory arranged as a circular first-in-first-out dual port memory. The data buffer compensates for the differing data transfer speeds of the source and of the destination. During a write transaction, the host computer is the source and the storage media of the data storage device is the destination. During a read transaction, the storage media is the source and the host computer is the destination.

For example, during a write transaction from the host computer to the data storage device, the host computer transfers a write data block to the data buffer according to the data transfer speed of the input/output bus coupled between the host computer and the data storage device. The write data block is then transferred from the data buffer to the storage media according to the data transfer speed of the storage media. During a read transaction, a read data block is transferred from the storage media to the data buffer according to the data transfer speed of the storage media, and thereafter transferred from the data buffer to the host computer according to the data transfer speed of the input/output bus.

The data buffer may also function as a cache for frequently accessed data, and for anticipated data accesses. For example, sequential read transactions are common during normal data transfer operations to a disk device. Therefore, read ahead caching may be employed to cache sequential read data blocks from the disk media into the data buffer after a normal read access. If a subsequent host read command is targeted for a read data block stored in the read ahead cache, the read data block is instantly available to the host computer without the normal read/write head positioning overhead. The portions of the data buffer holding cached data are not available to buffer a data transfer sequence.

The data buffer should be managed to provide a smooth continuous data flow between the host computer and the storage media despite the differing data transfer speeds and media positioning overhead. Also, the data buffer should be managed to minimize the occurrences of buffer full and buffer empty conditions during data transfer operations.

One prior art method for managing the data buffer allocates the entire data buffer from a fixed starting location for any host computer read or write transaction regardless of the data size for the transaction. Unfortunately, such a method destroys all cached data even though the transaction may require only a portion of the data buffer.

For example, if the fixed starting location in the data buffer is zero, a read transaction from the host computer causes transfer of a read data block from the disk media to the data buffer starting at location zero. Thereafter, as the read data block is transferred to the host computer, the free data buffer locations starting at zero become available for read ahead caching. However, a subsequent write transaction or a non-sequential read transaction from the host computer causes transfer of a new data block to the data buffer starting at location zero, thereby probably destroying the next sequential and possibly all cached data.

Another prior art method of data buffer management partitions the data buffer into a fixed length write buffer, and a fixed length read buffer. Typically, the read buffer and the write buffer have equal length. However, the resulting limited size of the read and write buffers reduces overall system throughput by increasing the occurrences of buffer full and buffer empty conditions. Moreover, the fixed partitioning of the read and write buffers limits the size of a read ahead cache to the size of the read buffer, even in an all read command stream. As a consequence, several sequential read transactions can rapidly exhaust the cached data, thereby causing delays in execution of a read transaction and reducing system throughput.

SUMMARY AND OBJECTS OF THE INVENTION

One object of the present invention is to partition a data buffer into separate read and write buffers for processing data transfer commands from a host computer.

Another object of the present invention is to partition the data buffer for processing data transfer commands from a host computer, such that the boundaries between the buffers and the sizes of the buffers change dynamically depending upon the command mix received from the host computer.

Another object of the present invention is to partition the data buffer into separate read and write buffers and a read ahead cache for processing data transfer commands from a host computer.

Another object of the present invention is to partition the data buffer for processing data transfer commands from a host computer, while granting highest priority to processing the current host command and next priority to preserving the read ahead cache.

A further object of the present invention is to partition a data buffer into separate read and write buffers and a read ahead cache for processing data transfer commands from a host computer to a disk device.

These and other objects of the present invention are provided by a method and apparatus for transferring data between a host computer and a storage media of a data storage device. A processor in the data storage device receives commands from a host computer. The commands indicate a read or a write transaction and a data length. If the command is a read transaction, the processor allocates a read buffer in a forward direction in a circular data buffer. The read buffer has a length equal to the data length specified in the read command. Thereafter, a read data block is transferred from the storage device through the read buffer to the host computer.

If the command from the host computer is a write transaction, the processor allocates a write buffer in a reverse circular direction in the data buffer. The write buffer has a length equal to the data length specified in the write command. Thereafter, a write data block is transferred from the host computer through the write buffer to the storage media.

After a read transaction requiring access of the storage media, the processor allocates a read ahead cache in the data buffer in the forward direction. The processor then initiates a read ahead operation to transfer a plurality of sequential read blocks from the storage media to the read ahead cache.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
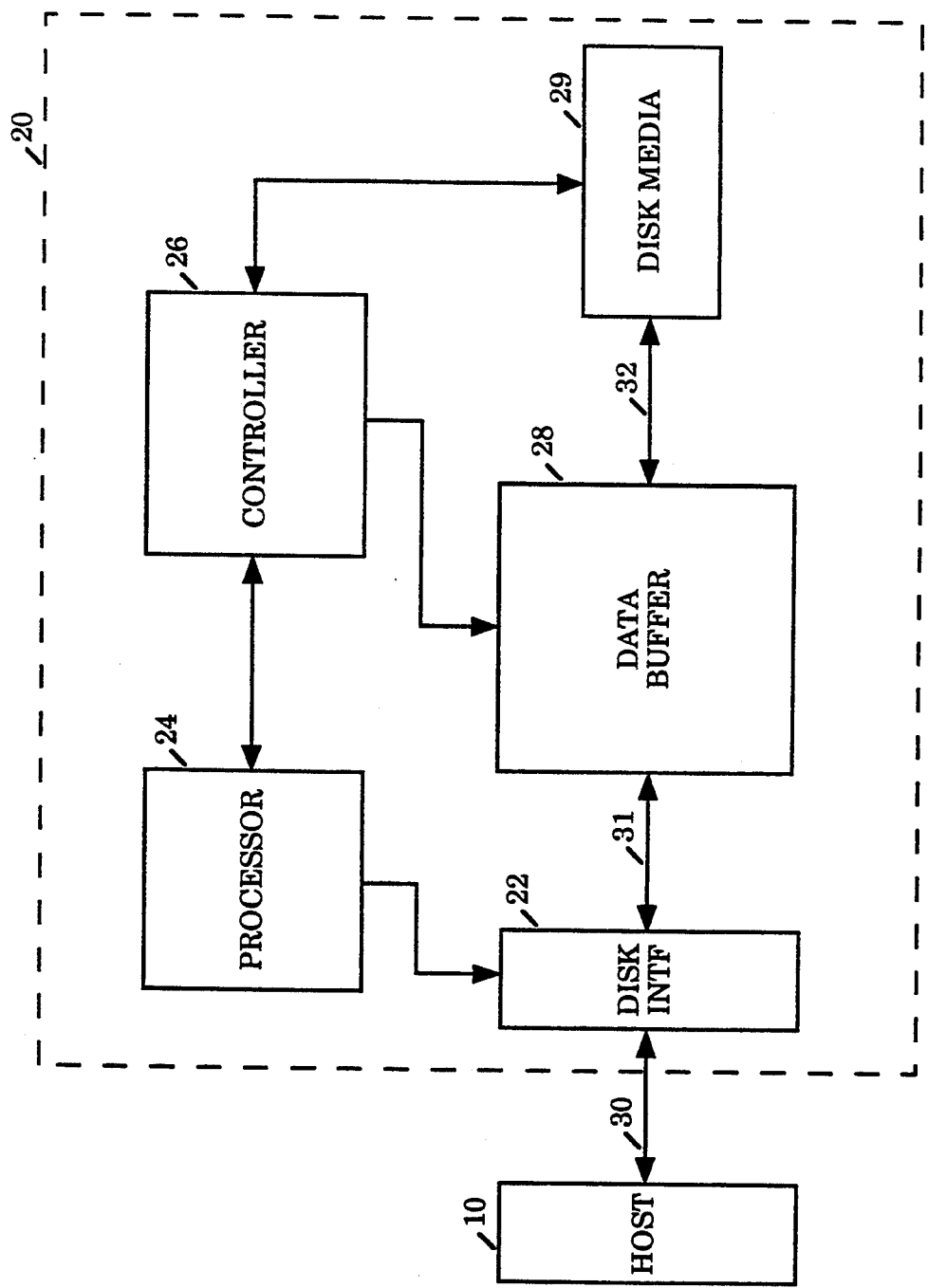
FIG. 1 illustrates a host computer coupled to communicate with a disk drive over a bus, wherein the host computer performs read transactions and write transactions to the, disk drive.

FIG. 1 illustrates a host computer 10 coupled to communicate with a disk drive 20 over a bus 30. The host computer 10 transfers commands to the disk drive 20 over the bus 30 to initiate read transactions and write transactions to the disk drive 20. During write transactions, the host computer 10 transfers write data blocks to the disk drive 20 over the bus 30. During read transactions, the disk drive 20 transfers read data blocks to the host computer 10 over the bus 30.

The bus 30 represents a wide variety of peripheral and input/output busses for data transfer between a host computer and peripheral devices. For one embodiment, the bus 30 comprises an SCSI bus.

The disk drive 20 is comprised of a disk interface 22, a processor 24, a controller 26, a data buffer 28 and a disk media 29. The disk interface 22 receives commands and write data blocks from the host computer 10 over the bus 30. The disk interface 22 transfers write data blocks received from the host computer 10 to the data buffer 28 over a data bus 31. Also, the disk interface 22 accesses read data blocks stored in the data buffer 28 over the bus 31, and transfers read data blocks to the host computer 10 over the bus 30. Read and write data blocks are transferred between the data buffer 28 and the disk media 29 over a disk data bus 32.

The data buffer 28 is a dual port random access memory (RAM) arranged as a circular first-in-first-out (FIFO) memory. For one embodiment, the data buffer 28 comprises a 64K byte RAM. Memory locations for the two ports of the data buffer 28 are addressed with a host pointer and a disk pointer. The host pointer addresses memory locations of the data buffer 28 to transfer data between the data buffer 28 the host computer 10. During a write transaction, write data blocks from the host computer 10 are directed into the data buffer 28 according to the host pointer. During a read transaction, read data blocks are accessed from the data buffer 28 according to the host pointer, and transferred to the host computer 10.

The disk pointer addresses memory locations of the data buffer 28 to transfer data between the data buffer 28 the disk media 29. Write data blocks are transferred from the data buffer 28 to the disk media 29 according to the disk pointer, and read data blocks are transferred from the disk media 29 to the data buffer 28 according to the disk pointer.

The processor 24 sets up initial values for the host pointer and disk pointer. The host pointer and disk pointer both auto-increment when performing data transfer sequences. After data deposited in a memory location of the data buffer 28 by the host computer 10 is transferred to the disk media 29, the memory location becomes available. Similarly, after data deposited in a memory location of the data buffer 28 by the disk media 29 is transferred to the computer 10, the memory location become available. Data transfer sequences larger than the data buffer 28 cause the host and disk pointers to wrap in a circular fashion.

The processor 24 dynamically partitions the data buffer 28 into separate read and write buffers. The processor 24 determines the boundaries between the read and write buffers, and determines the sizes of the read and write buffers according to the sequence of commands received from the host computer 10. In partitioning the data buffer 28, the processor 24 assigns the highest priority to processing the current command from the host computer 10, and next priority to preserving the next sequential data from the last read request in a read ahead cache in the data buffer 28. The processor 24 assigns a high priority to the read ahead cache due to the high probability of the occurrence of sequential read transactions.

The read and write commands received from the host computer 10 specify a target data area of the, disk media 29 for the transaction. Accordingly, the processor 24 issues control commands to the controller 26 to access the disk media 29. The controller 26 issues disk control signals to position the read/write heads of the disk media 29 in order to access the target data area of the transaction. For one embodiment, the target data area is specified in read and write commands over the SCSI bus 30 by a logical block address.

The processor 24 employs read ahead caching to reduce the data transfer latency caused by the radial and rotational positioning of the read/write heads on the disk media 29. Accordingly, after a read data block is transferred to a read buffer in the data buffer 28 while processing a read command from the host computer 10, sequential read data blocks from the disk media 29 are transferred to a read ahead cache in the data buffer 28. The processor 24 maintains a log identifying the read data blocks stored in the read ahead cache. If a subsequent read command from the host computer 10 is targeted for a read data block stored in the read ahead cache, the read data block is immediately transferred from the read ahead cache to the host computer over the bus 30.

Read ahead caching enables sequential (or near sequential) transfer of read data blocks from the disk media 29 to the data buffer 28 without additional radial and rotational positioning penalty. The time saved can be substantial, since a seek operation for the disk media 29 can consume from 4 to 30 milliseconds for one embodiment. Rotational orientation can consume from zero to 16.6 milliseconds at 3600 rpm.

FIGS. 2a-2d illustrate the partitioning of the data buffer 28 for an example sequence of commands from the host computer 10 comprising a read transaction followed by two write transactions. The circular organization of the data buffer 28 is shown with addresses ranging from 0-FFFF hex.

Figure 2A:
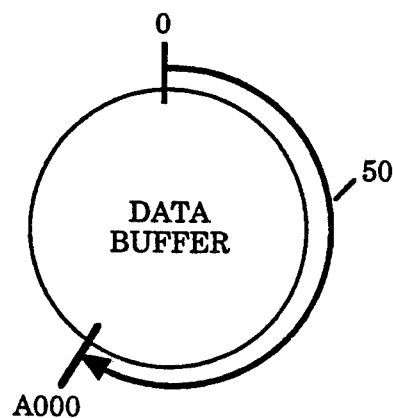
FIGS. 2a-2d illustrate the partitioning of the data buffer for an example sequence of commands from the host computer comprising a read transaction followed by two write transactions.

The first command from the host computer 10 specifies a read transaction with a data length of A000 hex bytes. As shown in FIG. 2a, the processor 24 allocates a read buffer 50 in the forward direction starting at location 0 in the data buffer 28. The processor 24 sets the disk pointer to zero in preparation for transfer of a read data block into the read buffer 50. The disk pointer sequentially increments to A000 hex in the forward direction as the read data block is transferred from the disk media 29 to the read buffer 50. Thereafter, the processor 24 sets up the host pointer to zero in preparation for transfer of the read data block from the read buffer 50 to the host computer 10.

Figure 2B:
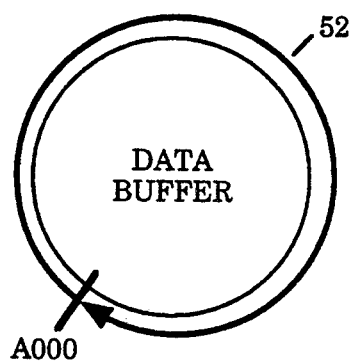

FIG. 2b illustrates a read ahead operation following the transfer of the read data block to the read buffer 50. Sequential read data blocks are transferred to a read ahead cache 52 in the forward direction starting at location A000 hex in the data buffer 28. The read ahead operation is performed while the read data block in read buffer 50 is transferred to the host computer 10. As the read data block is transferred out of the read buffer 50, individual locations of the read buffer 50 become available for the read ahead cache 52. Thus, the read ahead operation continues to fill the read ahead cache 52 up to location 9FFF hex after the read data block 50 is completely transferred to the host computer 10. The read ahead operation is terminated if a non sequential read command or a write command is subsequently received from the host computer 10.

Figure 2C:
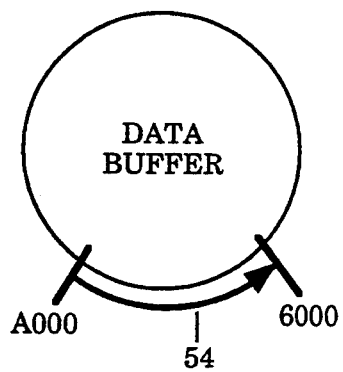

As shown in FIG. 2c, the processor 24 allocates a write buffer 54 in a reverse circular direction when the next command from the host computer 10 specifies a write transaction having a data length of 4000 hex. Also, the processor 24 terminates the read ahead operation if still underway. The processor 24 sets up the host pointer to the start of the write buffer 54 by backing up the current host pointer according to the data length for the write transaction. Accordingly, the processor 24 subtracts the current value of the host pointer A000 hex by the data length 4000 hex, which yields 6000 hex as the start of the write buffer 54.

Thereafter, the host computer 10 transfers a write data block for the write transaction into the write buffer 54 as the host pointer increments to A000 hex. However, the read data stored in the portion of the read ahead cache 52 between A000 hex and 6000 hex is preserved.

Figure 2D:
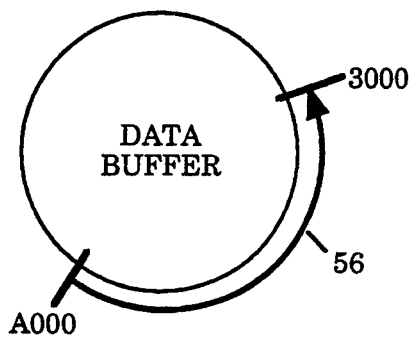

As shown in FIG. 2d, the processor 24 allocates a write buffer 56 in a reverse circular direction when the next command from the host computer 10 specifies a write transaction having a data length of 7000 hex. The processor 24 sets up the host pointer for the write transaction by backing up the host pointer from A000 hex to 3000 hex. The host computer 10 then transfers a write data block for the write transaction into the write buffer 56 as the host pointer increments to A000 hex. The read data stored in the portion of the read ahead cache 52 between A000 hex and 3000 hex is still preserved for a subsequent read command from the host computer 10.

FIGS. 3a-3d illustrate the partitioning of the data buffer 28 for a subsequent sequence of commands from the host computer 10 comprising two read transactions followed by a write transaction. The data buffer 28 still contains valid read data stored in the portion of the read ahead cache 52 between locations A000 hex and 3000 hex in the forward direction.

Figure 3A:
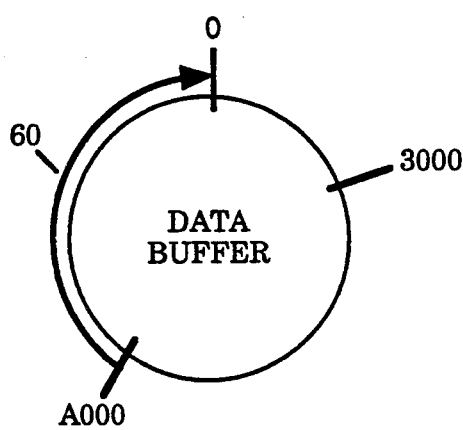
FIGS. 3a-3d illustrate the partitioning of the data buffer for an example sequence of commands from the lost computer comprising two read transactions followed by a write transaction.

The next command from the host computer 10 specifies a read transaction with a data length of 6000 hex bytes. The read command is targeted for read data stored in the read ahead cache 52. As illustrated in FIG. 3a, the targeted read data is stored in a read data block 60 between locations A000 hex and zero. Thus, the processor 24 immediately sets the host pointer to A000 hex in preparation for transfer of the read data block 60 to the host computer 10. The host pointer sequentially increments to zero as the read data block 60 is transferred out of the data buffer 28.

Figure 3B:
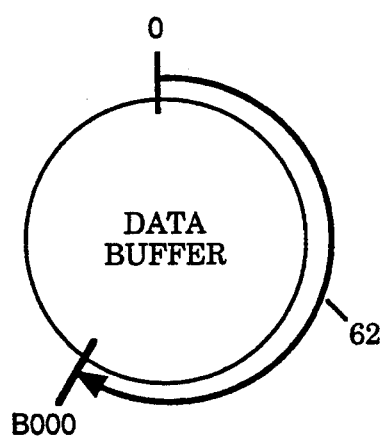

FIG. 3b shows a read buffer 62 allocated by the processor 24 in the forward direction when the next command from the host computer 10 specifies a read transaction with a data length of B000 hex bytes. The processor 24 sets up the disk pointer to zero in preparation for transfer of a read data block from the disk media 29 to the read buffer 22. The processor 24 also sets up the host pointer to zero to setup transfer of the read data block from the read buffer 62 to the host computer 10.

Figure 3C:
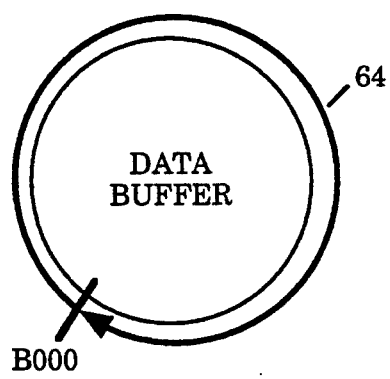

FIG. 3c illustrates a read ahead operation following the transfer of the read data block to the read buffer 62. Sequential read data blocks are transferred to a read ahead cache 64 in the forward direction starting at location B000 hex in the data buffer 28. The read ahead operation is performed while the read data block in read buffer 62 is transferred to the host computer 10. The read ahead operation continues to fill the read ahead cache 64 up to location AFFF hex after the read data block 62 is completely transferred to the host computer 10. The read ahead operation is terminated if a non sequential read command or a write command is subsequently received from the host computer 10.

Figure 3D:
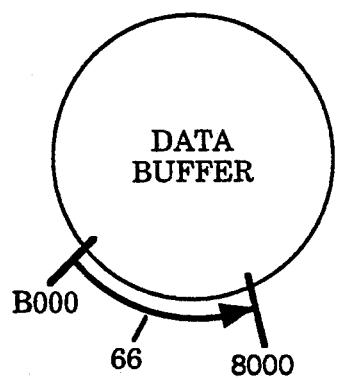

FIG. 3d illustrates a write buffer 66 allocated in a reverse direction by the processor 24 when the next command from the host computer 10 specifies a write command having a data length of 3000 hex. The processor 24 also terminates any read ahead operation underway. The processor 24 sets up the host pointer for the write transaction by subtracting the current value of the host pointer B000 hex by the data length 3000 hex, which yields 8000 hex as the start of the write buffer 66. The host computer 10 then transfers a write data block for the write transaction into the write buffer 66 in the forward direction. Thereafter, the write data block is transferred from the write buffer 66 to the appropriate area of the disk media 29.

Figure 4:
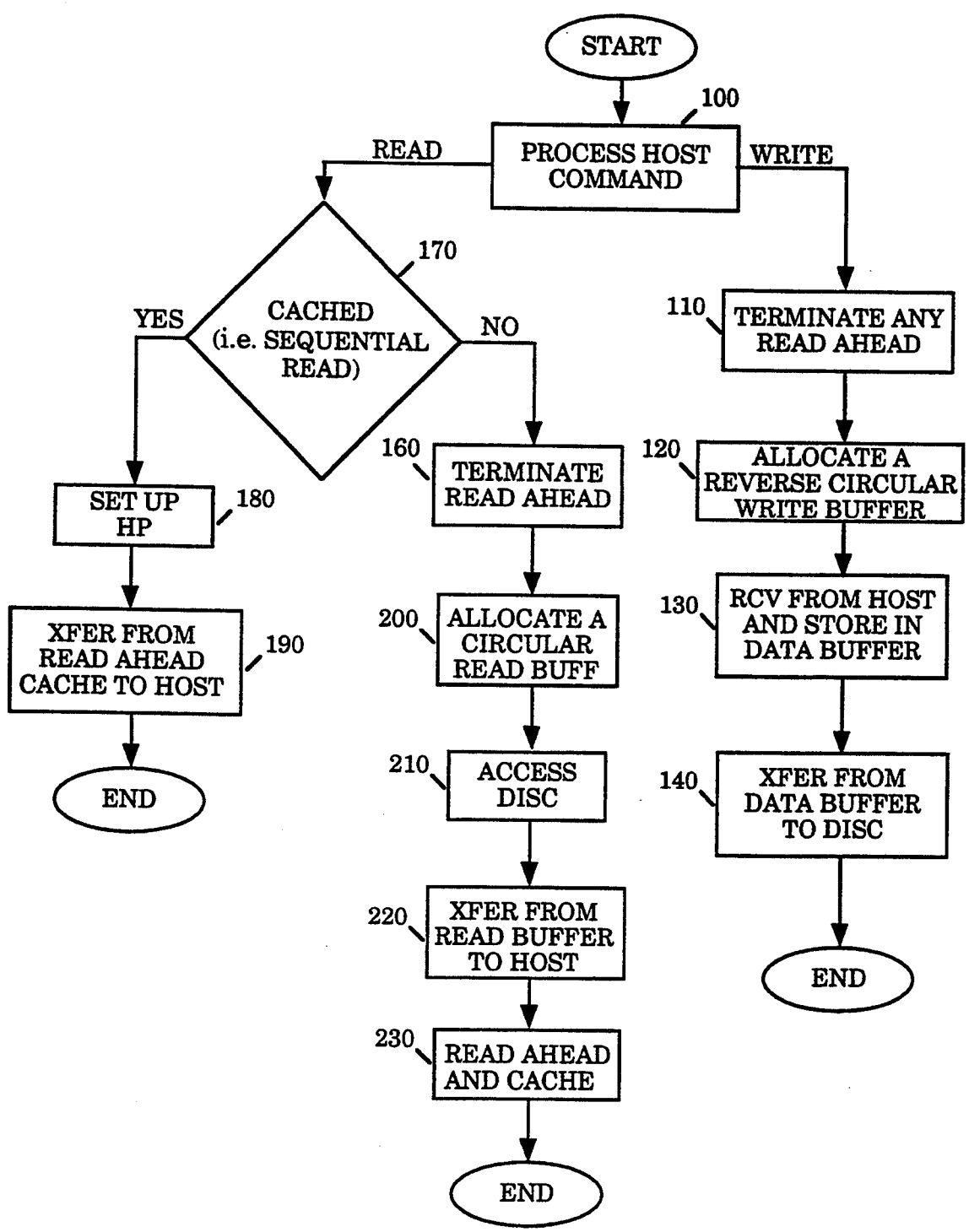
FIG. 4 is a flow diagram illustrating a method for dynamically partitioning the data buffer into read and write buffers according to the command mix received from the lost computer.

FIG. 4 is a flow diagram illustrating a method for dynamically partitioning the data buffer 28 into read and write buffers according to the command mix received from the host computer 10. The method illustrated grants highest priority to processing the current command from the host computer 10, and next priority to preserving the next sequential portion of a read ahead cache in the data buffer 28.

At block 100, the processor 24 receives a host command from the host processor 10 through the disk interface 22. The host command specifies a read or write transaction and a data length. If the command from the host processor 10 is a write transaction, then control proceeds to block 110.

At block 110 the processor 24 terminates any read ahead operation currently in progress. To terminate a read ahead operation, the processor 24 issues a command to the controller 26 to terminate any current read operation of the disk media 29. Control then proceeds to block 120 to allocate a write buffer for the write transaction.

At block 120, the processor 24 allocates a write buffer in a reverse circular direction in the data buffer 28 frown the pointer to the start of the read ahead data. The processor 24 subtracts the pointer to the start of the read ahead data by the data length of the write transaction to setup the host pointer for the write buffer. At the same time, the processor 24 sets the disk pointer to the same value as the host pointer to setup a subsequent transfer from the write buffer to the disk media 29.

At block 130, a write data block corresponding to the write transaction is received from the host computer 10. The write data block is stored in the allocated write buffer in the data buffer 28 under direction of the incrementing host pointer. At block 140, the write data block is transferred from the allocated write buffer in the data buffer 28 to the disk media 29 under direction of the incrementing disk pointer.

If the host command at block 100 is a read transaction, then control proceeds to decision block 170. If the read transaction is a sequential read (i.e. cached) at decision block 170, then control proceeds to block 180. A sequential read is a read transaction targeted for an area of the disk media 29 that has already been stored in a read ahead cache.

At block 180, the processor 24 sets the host pointer to the start of the targeted read data block in the read ahead cache. Thereafter, at block 190, the targeted read data block is transferred from the read ahead cache to the host computer 10 over the bus 30.

If the targeted read data block is not stored in the read ahead cache at decision block 170, then control proceeds to block 160 to terminated any read ahead operation in progress. Thereafter at block 200, the processor 24 allocates a circular read buffer in the data buffer 28 in the forward direction. The processor 24 sets the disk pointer to the start of the circular read buffer to setup the transfer of the targeted read data block from the disk media 29 to the read buffer. At block 210, the processor 24 causes the controller 26 to access the disk media 29 and transfer the targeted read data block to the allocated read buffer under direction of the incrementing disk pointer.

At block 220, the processor 24 sets up the host pointer to the start of the allocated read buffer, and initiates transfer of the read data block from the read buffer to the host computer 10 over the bus 30. Thereafter at block 230, the processor 24 causes the controller 26 to perform a read ahead operation of the disk media 29. The read ahead operation transfers sequential read data from the disk media 29 to a read ahead cache in the data buffer 28. The read ahead cache is allocated in a forward circular direction as directed by the disk pointer.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for transferring data between a host computer and storage media of a storage device, comprising the steps of:
   (a) receiving a command from the host computer, the command comprising a read or write transaction and a data length;
   (b) if the command is a read transaction, then allocating a read buffer in a forward direction in a circular data buffer starting at a read location in the circular data buffer determined by a host pointer into the circular data buffer, and transferring a read data block from the storage media through the read buffer to the host computer, the read buffer having a length equal to the data length;
   allocating read ahead cache in the circular data buffer in the forward direction;
   initiating a read ahead operation to transfer a plurality of sequential read data blocks from the storage media to the read ahead cache;
   (c) if the command is a write transaction, then allocating a write buffer in a reverse circular direction in the circular data buffer starting at a write location in the circular data buffer determined by subtracting the data length from the host pointer into the circular data buffer, and transferring a write data block from the host computer through the write buffer to the storage media, the write buffer having a length equal to the data length;
   (d) receiving a next command from the host computer, the next command comprising the read or the write transaction and a next data length;
   terminating the read ahead operation if the next command is not the read transaction targeted for a read data block stored in the read ahead cache.

2. The method of claim 1, wherein step (b) further comprises the steps of:
   (a) allocating a next read buffer in the circular data buffer in the forward direction;
   (b) transferring a sequential read data block from the storage media to the next read buffer.

3. The method of claim 1, wherein step (b) further comprises the steps of:
   (a) allocating a next read buffer in the circular data buffer in the forward direction;
   (b) transferring a sequential read data block from the storage media to the next read buffer;
   (c) receiving a next command from the host computer, and repeating steps (a) through (b) if the next command is a read transaction targeted for the sequential read data block.

4. The method of claim 1, wherein the storage device is a disk drive comprising read/write heads and at least one disk platter.

5. The method of claim 4, further comprising the steps of:
   receiving a next command from the host computer, the next command comprising the read or the write transaction and a next data length;
   terminating the read ahead operation if the next command requires repositioning of the read/write heads over the disk platter.

6. The method of claim 1, further comprising the step of transferring a next read data block from the read ahead cache, to the host computer if the next command is the read transaction targeted for the next read data block stored in the read ahead cache.

7. The method of claim 6, further comprising the steps of:
- if the next command is the read transaction not targeted for the next read data block stored in the read ahead cache, then allocating a next read buffer in the forward direction in a circular data buffer, and transferring the next read data block from the storage media through the next read buffer to the host computer, the next read buffer having a length equal to the next data length;
- if the command is the write transaction, then allocating a next write buffer in the reverse circular direction in the circular data buffer, and transferring a next write data block from the host computer through the next write buffer to the storage media, the next write buffer having a length equal to the next data length.

8. An apparatus for transferring data between a host computer and a storage media of a storage device, comprising:
- means for receiving a command from the host computer, the command comprising a read or a write transaction and a data length;
- means for allocating a read buffer in a forward direction in a circular data buffer starting at a read location in the circular data buffer determined by a host pointer into the circular data buffer if the command is a read transaction, and transferring a read data block from the storage media through the read buffer to the host computer, the read buffer having a length equal to the data length;
- means for allocating a read ahead cache in the circular data buffer in the forward direction;
- means for initiating a read ahead operation to transfer a plurality of sequential read data blocks from the storage media to the read ahead cache;
- means for allocating a write buffer in a reverse circular direction in the circular data buffer starting at a write location in the circular data buffer determined by subtracting the data length from the host pointer into the circular buffer if the command is a write transaction, and transferring a write data block from the host computer through the write buffer to the storage media, the write buffer having a length equal to the data length;
- means for receiving a next command from the host computer, the next command comprising the read or the write transaction and a next data length;
- means for terminating the read ahead operation if the next command is not the read transaction targeted for a read data block stored in the read ahead cache.

9. The apparatus of claim 8, wherein the means for allocating a read buffer in a forward direction in a circular data buffer further comprises:
- means for allocating a next read buffer in the circular data buffer in the forward direction;
- means for transferring a sequential read data block from the storage media to the next read buffer.

10. The apparatus of claim 8, wherein the means for allocating a read buffer in a forward direction in a circular data buffer further comprises:
- means for allocating a next read buffer in the circular data buffer in the forward direction;
- means for transferring a sequential read data block from the storage media to the next read buffer.

11. The apparatus of claim 8, wherein the storage device is a disk drive comprising read/write heads and at least one disk platter.

12. The apparatus of claim 11, further comprising:
- means for receiving a next command from the host computer, the next command comprising the read or the write transaction and a next data length;
- means for terminating the read ahead operation if the next command requires repositioning of the read/write heads over the disk platter.

13. The apparatus of claim 8, further comprising means for transferring a next read data block from the read ahead cache to the host computer if the next command is the read transaction targeted for the next read data block stored in the read ahead cache.

14. The apparatus of claim 13, further comprising:
- means for allocating a next read buffer in the forward direction in a circular data buffer if the next command is the read transaction not targeted for the next read data block stored in the read ahead cache, and transferring the next read data block from the storage media through the next read buffer to the host computer, the next read buffer having a length equal to the next data length;
- means for allocating a next write buffer in the reverse circular direction in the circular data buffer if the command is the write transaction, and transferring a next write data block from the host computer through the next write buffer to the storage media, the next write buffer having a length equal to the next data length.

* * * * *